Patented Feb. 12, 1924.

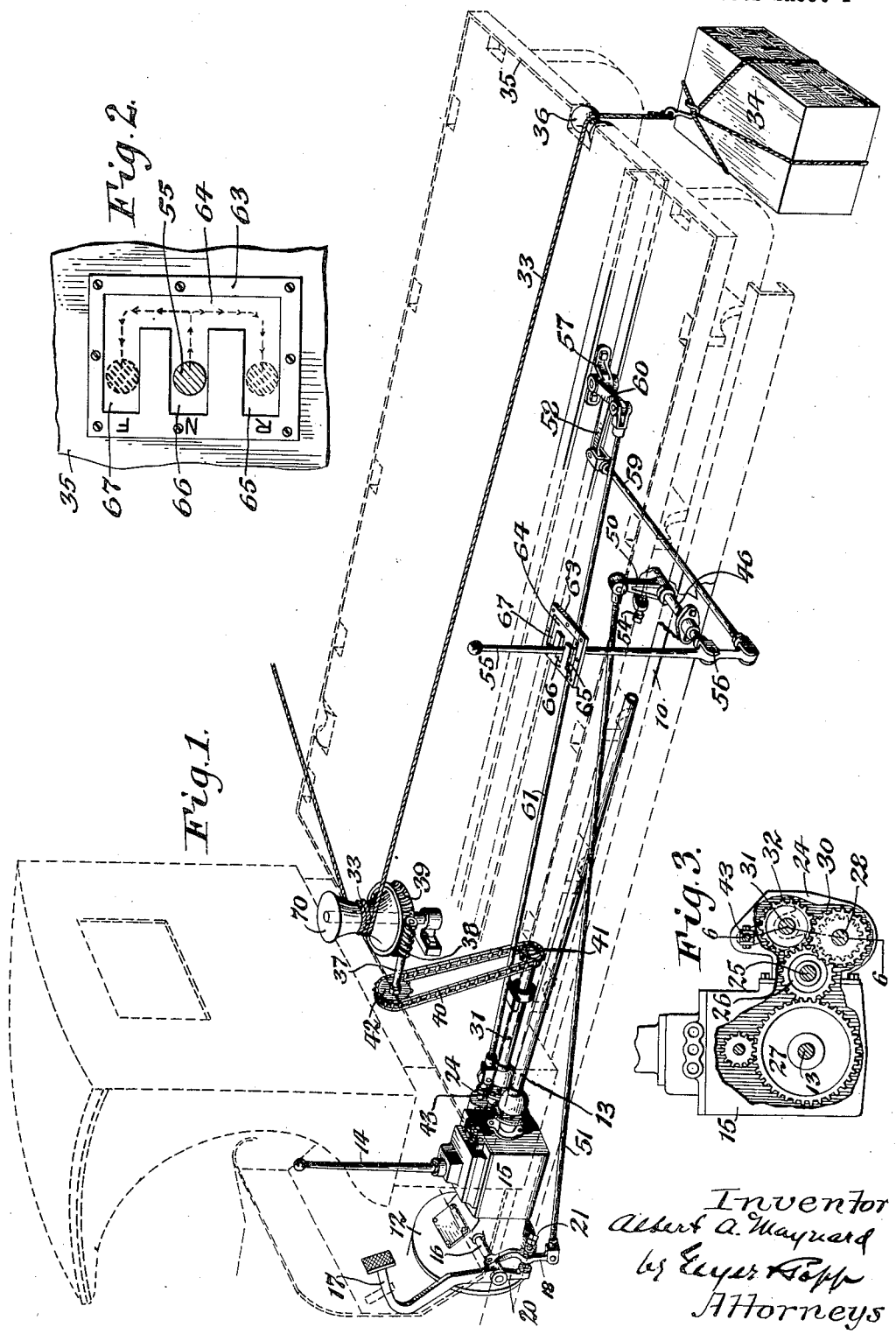

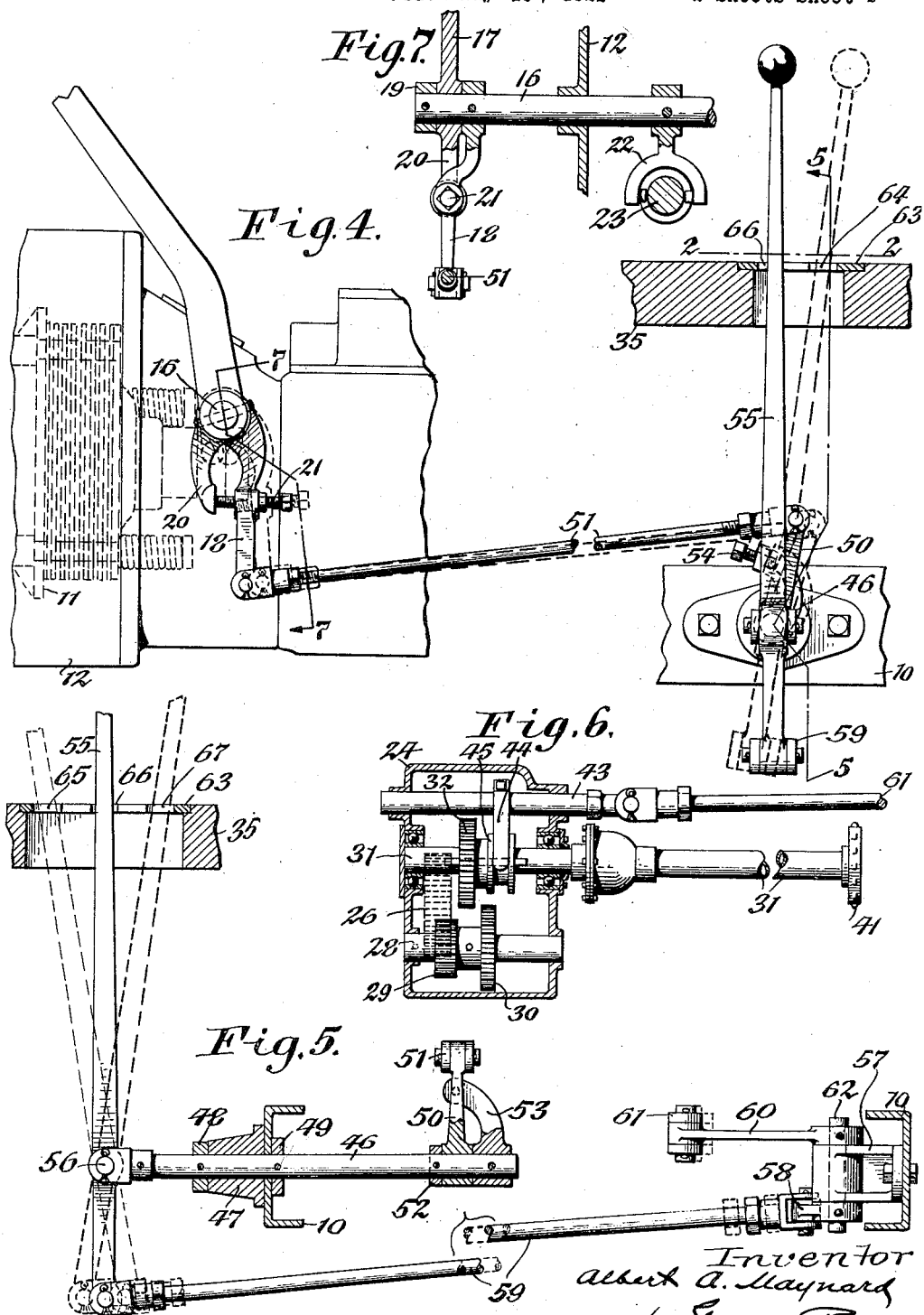

1,483,231

UNITED STATES PATENT OFFICE.

ALBERT A. MAYNARD, OF BUFFALO, NEW YORK, ASSIGNOR TO STEWART MOTOR CORPORATION, OF BUFFALO, NEW YORK, A CORPORATION OF NEW YORK.

POWER TAKE-OFF-CONTROLLING MECHANISM FOR AUTOMOBILES.

Application filed May 13, 1922. Serial No. 560,690.

*To all whom it may concern:*

Be it known that I, ALBERT A. MAYNARD, a citizen of the United States, residing in Buffalo, in the county of Erie and State of New York, have invented new and useful Improvements in Power Take-Off-Controlling Mechanism for Automobiles, of which the following is a specification.

This invention relates to a power take-off controlling mechanism for automobiles which permits of utilizing the power of the gasoline motor of the automobile not only for propelling or driving the car, but also for lifting or moving loads or doing other work by power.

Power take-off devices heretofore in use were usually so constructed that they required two men to operate the same, one man for throwing out the clutch of the ordinary automobile propelling mechanism and another man to operate the gear shift of the power take-off mechanism.

It is the purpose of the present invention to permit these operations to be performed by a single operator so that upon manipulating a single lever the operator is able to operate the ordinary clutch of the automobile and also to shift the coupling of the power take-off mechanism without one interfering with the other or permitting clashing of the gears at any time.

In the accompanying drawings:

Figure 1 is a perspective view of the parts of an automobile equipped with my improved power take-off mechanism. Figure 2 is a horizontal section, taken on line 2—2, Fig. 4. Figure 3 is a vertical transverse section of the power take-off mechanism. Figure 4 is a fragmentary side elevation thereof, partly in section, and on an enlarged scale. Figure 5 is a vertical transverse section, taken on line 5—5, Fig. 4. Figure 6 is a vertical longitudinal section, taken on line 6—6, Fig. 3. Figure 7 is a vertical transverse section taken on line 7—7, Fig. 4.

Similar characters of reference refer to like parts throughout the several views.

In its general organization the automobile shown in the drawings in connection with my improvements comprises a main frame 10 which may be of any suitable construction, a clutch 11 which is arranged in an enclosing casing 12 and which operates to connect the usual gasoline or explosion motor with the driving shaft 13 leading to the driving gearing of the automobile whereby the same is propelled over the road. A change speed gearing of which the hand lever 14 forms a part and which is enclosed within a casing 15 is interposed between the clutch and the driving shaft 13, said change speed gearing being constructed to permit of propelling the car either forwardly or backwardly at different speeds and also to permit the car to remain at rest while the engine is running. In the present instance this clutch is provided with an operating shaft 16, one end of which projects laterally from the enclosing casing 12 and is provided at its outer end with an upwardly projecting foot lever or pedal 17 which is operatively connected with the shaft 16 in such a manner that when this foot lever is pressed forwardly the clutch will be disengaged and thereby disconnect the engine from the propelling mechanism of the car, while upon removing the forward pressure upon this lever the clutch will re-engage and connect the engine with the driving mechanism so that the car will be operated in accordance with the position of the change speed mechanism within the casing 15.

The clutch which connects and disconnects the engine and the propelling mechanism of the car may be of any suitable and approved form, as well as the means for moving the same into its operative and inoperative positions and it has therefore been deemed sufficient for the present to indicate in a general way typical means for operating this clutch from the rock shaft 16 which means, as shown in Fig. 7 comprise a fork lever 22 arranged on the clutch shaft 16 and engaging with a grooved collar 23 which connects with the clutch in such manner so that upon rocking the shaft 16 in one direction the clutch 11 will be opened and upon rocking the same in the opposite direction the clutch will be closed.

For a purpose which will presently appear, the clutch operating lever 17 is mounted loosely upon the clutch shaft 16 between a depending clutch arm 18 secured to this shaft on one side of the lever 17 and a collar 19 secured to this shaft on the opposite side of the same and the foot lever 17 is provided with a downwardly extending arm 20 which engages with a screw 21 projecting forwardly from the arm 18, as shown in Figs. 1, 4 and 7, so that a forward pressure upon the foot lever will cause the clutch arm 18 to move backwardly and the clutch shaft 16 to be turned in a direction for releasing or opening the engine clutch.

The power take-off mechanism may also be of any suitable construction similar to those now found on the market for this purpose, that for example shown in the drawings, comprising an enclosing casing 24 secured to one side of the casing 15 which encloses the change speed gear, a longitudinal intermediate shaft 25 journaled in this casing and provided with an intermediate gear 26 which meshes with a driving gear wheel 27 on the driving shaft 13 of the car propelling mechanism, a counter shaft 28 journaled lengthwise in the casing 24 and provided with a counter gear 29 which meshes constantly with the intermediate gear 26 and also provided with a reversing gear wheel 30 of larger diameter, a driven shaft 31 journaled lengthwise in the casing 24 and operatively connected with the means which take hold of the load to be shifted and a change speed gear wheel 32 which is splined on the driven shaft 31 and which may be moved either into a position intermediate of the gears 26 and 30 so that no motion is transmitted from the counter shaft 28 to the driven shaft 31, as shown in Fig. 6, or this gear 32 may be moved forwardly to mesh with the intermediate gear 26 for causing a slow speed high power motion to be transmitted from the counter shaft 25 to the driven shaft 31, or the change speed gear 32 may be moved into its rearward position in which it engages with the reversing gear wheel 30 and thereby causing a high speed but low power motion to be transmitted from the counter shaft 25 to the driven shaft 31.

Various means may be employed for utilizing the motion of the driven shaft 31 for doing work of various kinds, for instance, as shown in Figs. 1 and 6, this motion is utilized for turning a capstan 70 which is mounted on the platform 35 of the automobile and upon which a rope 33 may be wound or unwound for raising or lowering a load which in the present instance is represented as a box 34 arranged at the rear end of the platform 35, a guide pulley 36 in this instance being mounted on the rear end of the platform for the purpose of supporting the rope or cable 33 in its turn around the rear end of this platform. The means shown in Fig. 1 for transmitting motion from the driven shaft 31 to the capstan comprise a shaft 37 which is journaled in any suitable manner and provided at one end with a worm 38 which engages with a worm wheel 39 on the lower part of the capstan, and a chain belt 40 passing around sprocket wheels 41 and 42 arranged on the driven shaft 31 and the worm shaft 37.

The shifting of the change speed gear 32 is effected in the present instance by means of a longitudinally movable shipper rod 43 which is guided on the enclosing casing 24 and provided within the casing with a fork 44 which engages with an annularly grooved collar 45 on the hub of the speed changing gear 32, by which means this gear is compelled to move lengthwise with the shipper rod but the same is permitted to turn independently thereof, in the usual and well known manner.

It will thus be noted that this change speed gearing of which the gear 32 forms a part, forms a coupling for connecting and disconnecting the motor of the automobile with the power take-off mechanism and operating the load or disconnecting the power take-off mechanism from the motor, as well as moving the load either forwardly or backwardly as required.

My improved controlling mechanism associated with this propelling mechanism of the car and the power take-off mechanism is preferably constructed as follows:

46 represents a horizontal controlling shaft which is journaled transversely in a suitable bearing 47 on the main frame of the car, so as to be capable of turning freely, but held against lengthwise movement, this being accomplished for instance, by means of collars 48, 49, secured to this shaft and engaging with opposite ends of the bearing 47, as shown in Fig. 5. Loosely mounted upon the inner part of the controlling shaft 46 is a floating rock arm 50 which is connected by means of a rod 51 with the lower end of the clutch arm 18 on the clutch shaft 16. The floating rock arm 50 is free to turn in one direction on the controlling shaft 46 but is held against lengthwise movement thereon between a collar 52 on the shaft engaging one side of the lever 50 and the hub of a controlling rock arm 53 which is secured at its inner end to the controlling shaft on the other side of the lever 50. This controlling arm 53 is provided with an adjusting screw 54 which bears against the front side of the floating arm 50, as shown in Figs. 1, 4 and 5.

On the outer end of the controlling shaft 46 is mounted a hand operating controlling lever 55 which is connected therewith by means of a pivotal joint 56 so that this lever is compelled to turn with this shaft but is free to swing in a plane parallel with the length of this shaft. The longitudinal swinging motion of this controlling lever is transmitted to the shipper rod 43 by means of an elbow lever pivoted on a bracket 57 on the main frame and having a longitudinal arm 58 which is connected with the lower arm of the controlling lever by means of a rod 59 while its transverse arm 60 is connected by means of a shifting rod 61 with the rear end of the shipper rod 43. The two arms 58 and 60 of the elbow lever are preferably secured to opposite ends of an upright shaft 62.

A locking and guiding device is associated with the upper arm of the controlling lever 55 so that the latter can only move in certain directions and thus compel the clutch operating mechanism and the coupling of the take-off mechanism to be operated in such a manner that they will not clash. In its preferred form this locking and guiding device is constructed in the form of a plate 63 which is secured to the upper side of the car platform and provided with a main releasing slot 64 extending transversely thereon and three longitudinal locking slots 65, 66 and 67 extending forwardly from the releasing slot, said slots 65 and 67 being arranged at opposite ends of the slot 64, and the slot 66 being intermediate of the slots 65 and 67.

The controlling lever 55 can only move crosswise of the platform in a direction parallel with the axis of the controlling shaft 46 when this lever is in the releasing slot 64 and when this lever engages with this last-mentioned slot, the same may be turned crosswise either into its central position or into its extreme outward position or into its extreme inward position. When in the central position, the controlling lever has shifted the shipper rod 43 so that the change speed gear 32 is arranged between the intermediate gear 26 and the reversing gear 30, as shown in Fig. 6, but when this lever is moved into the extreme outward position of the slot 64 the change speed gear 32 will be moved into mesh with the intermediate gear 26 for driving the capstan 70 or other load-moving devices at a slow speed but high power, while upon moving the controlling lever to the extreme inner end of the slot 64 the shipper rod 43 will be shifted so as to move the change speed gear 32 into mesh with the reversing gear 30, thereby coupling the power take-off mechanism in such manner that power will be transmitted from the engine to the load operating device at a high speed but low power. The controlling lever is locked in either of the three positions just described, upon moving the same forwardly either into the central locking slot 66 which will hold the power take-off mechanism in its neutral position, or into the outer slot 65 which will hold the power take-off mechanism in a position in which it moves forwardly at a low speed and high power or into the inner slot 67 which will hold the power take-off mechanism into a position for moving the load backwardly at a high speed and low power.

While the controlling lever 55 is thus moved backwardly with its upper arm in the transverse releasing slot 66 and is arranged in any part of the slot, the controlling arm 53 moves the floating arm 50 backwardly together with the lower clutch arm 18 and holds the clutch shaft 16 in a position in which the clutch is disengaged and no power is being delivered from the motor to the power take-off mechanism nor to the propelling mechanism, and it therefore follows that coupling of the power take-off mechanism will be shifted so that the same is held in its neutral, forward or backward driving positions without the liability of clashing the teeth of this mechanism while thus shifting the gears. After the gears of the power take-off mechanism have been coupled or shifted to the desired position relatively to each other the motor clutch 11 may be again let in or coupled for the purpose of operating the power take-off mechanism in accordance with its adjusted position by moving the upper arm of the controlling lever 55 into engagement with either of the slots 65, 66 or 67, which slots will permit of transmitting the power of the motor through the power take-off mechanism in only one of the three above described positions of the speed change gear 32 and thus avoid any uncertainty as to the operation of this gear. While the lever 55 is in engagement with one or the other of the locking slots 65, 66 and 67, it is impossible to move the controlling lever in a direction lengthwise of the controlling shaft and thereby prevent clashing of the gears while the motor is coupled with the power take-off mechanism.

When the power take-off mechanism is not in use and the driver of the automobile presses the foot lever or pedal 17 forwardly for the purpose of throwing out the clutch 11, this operation does not affect the power take-off mechanism, inasmuch as during such operation of the clutch lever 17 the same merely moves the floating lever 50 backwardly away from the screw 54 of the controlling arm 53 and therefore operates idly without transmitting any motion to the latter. By adjusting the screws 21 and 54 the relative positions of these parts may be adjusted for causing the same to operate at the proper time.

From the foregoing description it will be apparent that by this means an attendant by manipulating a single lever which in this instance is the controlling lever 55 is able by moving the same in one direction, to adjust the gear shift of the power take-off mechanism as required, and by moving this lever in another direction the motor clutch is rendered operative or inoperative and that by means of the locking plate 63 the movement of this controlling lever is so determined that the motor clutch can not be let in while shifting the gears of the power take-off mechanism, and that the gears of the power take-off mechanism must first be in a definite predetermined position before the motor clutch can be let in or coupled.

By thus organizing this mechanism so that it is capable of being operated with certainty and accuracy by a single person, the need for employing additional persons is not only avoided, but confusion and possible accidents as well as damage is avoided, as would be liable to occur where two different mechanisms which should be co-ordinated are manipulated by different persons.

I claim as my invention:

1. An automobile comprising a clutch adapted to connect and disconnect the motor with the propelling gearing and having a clutch operating rock shaft, and a foot lever mounted on said rock shaft, a power take-off having a driven shaft and a coupling mechanism for connecting and disconnecting said driven shaft and propelling gearing, a controlling rock shaft operatively connected with said clutch operating shaft, a hand lever mounted on said controlling rock shaft so as to be compelled to turn therewith and also capable of swinging in a plane lengthwise of the controlling shaft and operatively connected with said coupling mechanism, and a locking device having a releasing slot in which the hand lever is free to move in a plane parallel with the axis of the controlling shaft for shifting said coupling from one position to another and a plurality of locking slots which extend at right angles from said releasing slot and into one or another of which said hand lever is adapted to be moved in a plane at right angles to the axis of said controlling shaft and to be held therein against movement parallel with the axis of said controlling shaft.

2. An automobile comprising a clutch adapted to connect and disconnect the motor with the propelling gearing and having a clutch operating rock shaft, and a foot lever mounted on said rock shaft, a power take-off having a driven shaft and a coupling mechanism for connecting and disconnecting said driven shaft and propelling gearing, a controlling rock shaft operatively connected with said clutch operating shaft, and a hand lever mounted on said controlling rock shaft so as to be compelled to turn therewith and also capable of swinging in a plane lengthwise of the controlling shaft and operatively connected with said coupling mechanism, said controlling shaft being connected with said clutch rock shaft by a clutch rock arm secured to said clutch rock shaft, a controlling rock arm secured to said controlling rock shaft, and a floating rock arm connected with the clutch rock arm and compelled to move in one direction with said controlling rock arm and capable of moving independently thereof in the opposite direction.

3. An automobile comprising a clutch adapted to connect and disconnect the motor with the propelling gearing and having a clutch operating rock shaft, and a foot lever mounted on said rock shaft, a power take-off having a driven shaft and a coupling mechanism for connecting and disconnecting said driven shaft and propelling gearing, a controlling rock shaft operatively connected with said clutch operating shaft, and a hand lever mounted on said controlling rock shaft so as to be compelled to turn therewith and also capable of swinging in a plane lengthwise of the controlling shaft and operatively connected with said coupling mechanism, a foot lever mounted loosely on said clutch shaft, a clutch arm secured to said clutch shaft, a screw arranged on said clutch arm and engaging with said foot lever, a floating arm mounted loosely on said controlling shaft, a rod connecting said floating arm and clutch arm, and a controlling arm secured to said controlling shaft and provided with a screw engaging with one side of said floating arm.

ALBERT A. MAYNARD.